(12) United States Patent
Muto (10) Patent No.: US 9,914,161 B2
(45) Date of Patent: Mar. 13, 2018

(54) COIL SHAPING DEVICE AND COIL SHAPING METHOD

(71) Applicant: NITTOKU ENGINEERING CO., LTD., Saitama (JP)

(72) Inventor: Kenichi Muto, Fukushima (JP)

(73) Assignee: NITTOKU ENGINEERING CO., LTD., Saitama (JP)

( * ) Notice: Subject to any disclaimer, the term of this patent is extended or adjusted under 35 U.S.C. 154(b) by 297 days.

(21) Appl. No.: 14/664,783

(22) Filed: Mar. 20, 2015

(65) Prior Publication Data

US 2015/0273553 A1  Oct. 1, 2015

(30) Foreign Application Priority Data

Mar. 27, 2014  (JP) .................................. 2014-65101

(51) Int. Cl.
*B21C 47/14* (2006.01)
*H02K 15/04* (2006.01)

(52) U.S. Cl.
CPC ......... *B21C 47/146* (2013.01); *H02K 15/045* (2013.01); *H02K 15/0492* (2013.01); *Y10T 29/49071* (2015.01)

(58) Field of Classification Search
CPC .............. H02K 15/045; H02K 15/0492; B21C 47/146; Y10T 29/49071
See application file for complete search history.

(56) References Cited

U.S. PATENT DOCUMENTS

| | | | | |
|---|---|---|---|---|
| 7,124,977 B2* | 10/2006 | Sweeney | ................. | H01F 41/08 242/432.5 |
| 2007/0079642 A1* | 4/2007 | Bibeau | .................. | B21D 11/06 72/307 |
| 2012/0124822 A1* | 5/2012 | Ponzio | ................. | H02K 15/045 29/596 |

FOREIGN PATENT DOCUMENTS

JP  2002-158130 A  5/2002
JP  3588586 B2  11/2004

* cited by examiner

*Primary Examiner* — Peter DungBa Vo
*Assistant Examiner* — Jeffrey T Carley
(74) *Attorney, Agent, or Firm* — Rabin & Berdo, P.C.

(57) ABSTRACT

A coil shaping device includes a plurality of rollers having an outer circumference formed with a concave groove having an arc-shaped cross section, a roller moving mechanism making the rollers move between a gripping position, at the gripping position the plurality of rollers grips the coil from surroundings of the coil, and a separating position, at the separating position the plurality of rollers is separated from the coil, and a rolling movement mechanism making the plurality of rollers positioned in the gripping position move, by the plurality of rollers being rolled in a longitudinal direction of the coil.

3 Claims, 8 Drawing Sheets

COIL SHAPING DEVICE AND COIL SHAPING METHOD

TECHNICAL FIELD

The present invention relates to a coil shaping device and a coil shaping method.

BACKGROUND ART

Traditionally, coils made of wire wound around a winding core has been used as a coil used in rotors such as a coreless motor. With coils in rotors for small-sized coreless motors, there is a demand for high shape accuracy. One proposed manufacturing device for such a coil includes a cylindrical winding core and a nozzle that obliquely rotates with respect to an axis of the winding core while delivering wire (for example, see JP3588586B). In such winding devices, the wire is sequentially wound obliquely around an outer circumference of the winding core to form a hollow cylindrical coil.

SUMMARY OF INVENTION

In a winding device as described above, a nozzle delivering the wire is rotated obliquely with respect to an axis of the winding core. The wire is sequentially wound obliquely around a cylindrical winding core. As such, with a coil made of wire sequentially wound obliquely around the cylindrical winding core, the wire is bent over at edges in an axis direction of the coil. At this time, the wire may separate from the winding core at the edge where it is bent over, and may cause the outer diameter to become enlarged at the edges in the axis direction of the coil.

An object of the present invention is to shape a coil so that an outer diameter thereof is made to attain a desired value.

According to an aspect of the present invention, a coil shaping device shaping a coil made of wire sequentially wound obliquely around a cylindrical winding core, the coil shaping device includes a plurality of rollers having an outer circumference formed with a concave groove having an arc-shaped cross section, a roller moving mechanism that is configured to make the rollers move between a gripping position, at the gripping position the plurality of rollers grips the coil from surroundings of the coil, and a separating position, at the separating position the plurality of rollers is separated from the coil, and a rolling movement mechanism that is configured to make the plurality of rollers positioned in the gripping position move, by the plurality of rollers being rolled along a longitudinal direction of the coil.

According to another aspect of the present invention, a coil shaping method of shaping a coil made of wire sequentially wound obliquely around a cylindrical winding core includes gripping the coil at a substantially center along a longitudinal direction of the coil by a plurality of rollers having an circumference formed with a concave groove having an arc-shaped cross section, and moving the plurality of rollers by rolling the plurality of rollers along a longitudinal direction of the coil to fit the wire wound around the winding core to the winding core.

DESCRIPTION OF EMBODIMENTS

Described below is a coil shaping device 10 according to an embodiment of the present invention, with reference to the drawings.

Figure 1:
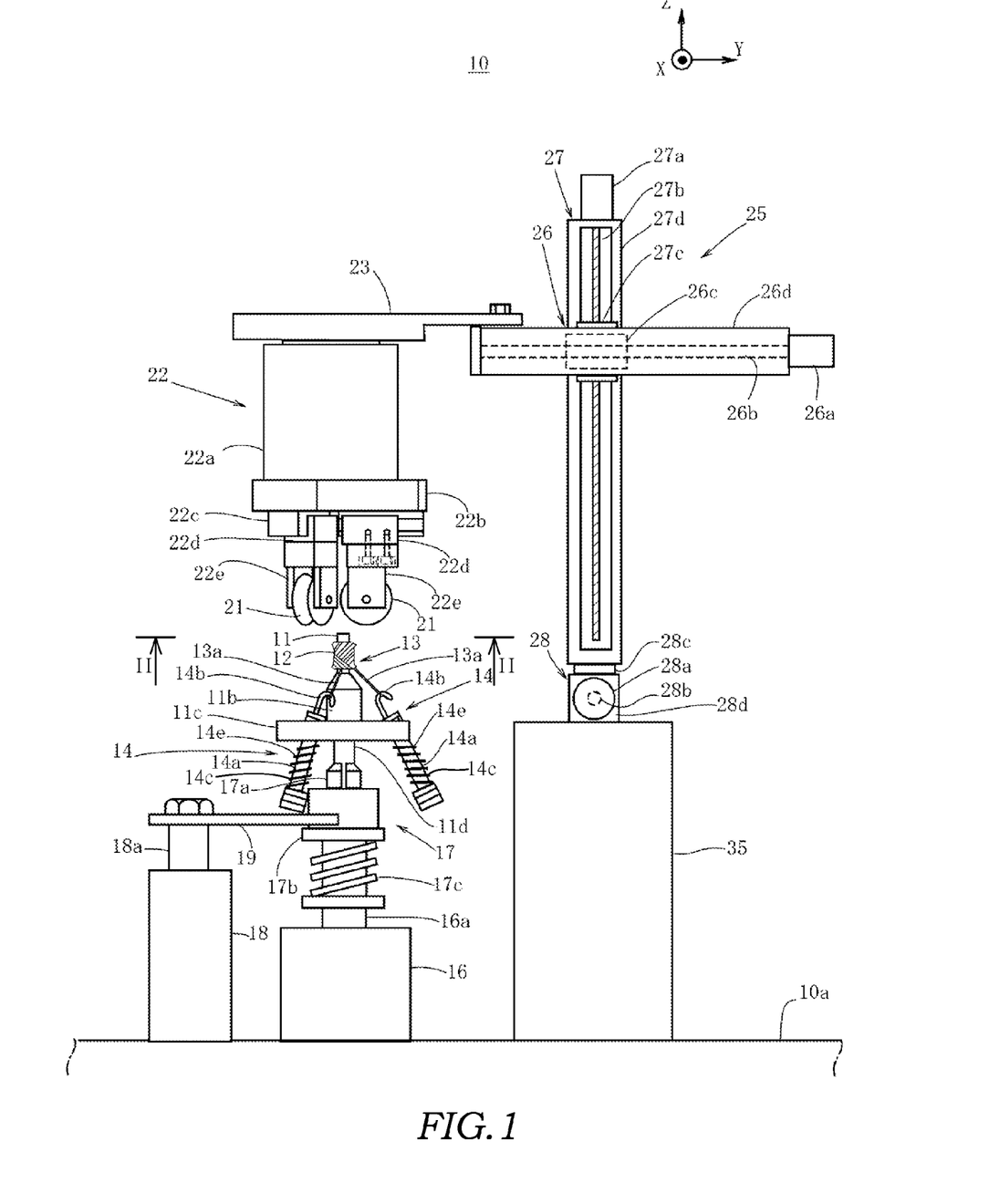
FIG. 1 is a front view showing a coil shaping device according to an embodiment of the present invention.

As shown in FIG. 1, the coil shaping device 10 shapes a coil 13 made of wire 12 that is sequentially wound obliquely around a cylindrical winding core 11. The coil 13 in the present embodiment is used in rotors such as a coreless motor.

For the manufacture of the coil 13, a flyer winding device (illustration omitted) is used for example. In the flyer winding device, a nozzle is moved rotating obliquely around the winding core 11 via a flyer in a state in which one end of the wire 12 is locked to the winding core 11. This allows for the wire 12 to be wound obliquely around the outer circumference of the winding core 11, to form the coil 13.

The winding core 11 shown in FIG. 1 is one used in the flyer winding device. The surroundings of the winding core 11 has the coil 13 formed thereon, which coil 13 is made of the wire 12 sequentially wound obliquely around by the flyer wire winding device. The coil 13 wound around the winding core 11 is taken off from the winding device together with the winding core 11, and is shaped by the coil shaping device 10 according to the embodiment of the present invention in this state.

The winding core 11 is of a solid round pole shape (cylindrical) around which the coil 13 is formed. The winding core 11 is formed with a supporting pole section 11b having a larger diameter than that of the winding core 11, continuing along the same axis in an axis direction.

The outer circumference of the supporting pole section 11b has a disk section 11c, formed by having the same axis as the supporting pole section 11b. The supporting pole section 11b has, at an end opposite to the winding core 11, a gripped section 11d that causes the winding core 11 to be gripped by a chuck 17 later described.

The disk section 11c has hook rods 14 that support lead wires 13a (tap) of the coil 13 formed around the winding core 11. A plurality of the hook rods 14 are provided at a lower part of the surroundings of the winding core 11, in predetermined intervals along the circumferential direction with respect to the number of lead wires 13a to be drawn out.

The hook rod 14 has a rod section 14a, and a hook section 14b formed in a predetermined curve provided on a tip of the rod section 14a (upper end in FIG. 1). The rod section 14a is inserted through the disk section 11c and can move upwards and downwards. A spring 14c is set on the lower side of the disk section 11c, which spring 14c energizes the hook rod 14 downwards. In the present embodiment, three hook rods 14 are inserted obliquely through the disk section 11c such that the intervals between each other expand as the hook rods 14 extend downwards.

The coil shaping device 10 has a motor 16 that serves as a winding core relative rotation mechanism causing the winding core 11 to rotate. The motor 16 is disposed on an upper surface of a base 10a so that a rotating shaft 16a is positioned upwards. The vertical rotating shaft 16a of the motor 16 is mounted with a chuck 17.

The chuck 17 is attached with the gripped section 11d in a detachable manner, which gripped section 11d is connected to the winding core 11 via the supporting pole section 11b along the same axis. The outer circumference of a chuck body 17a disposes a handle 17b movable in the axis direction, for detaching the gripped section 11d from the chuck 17.

A coil spring 17c is fitted into the chuck body 17a, which coil spring 17c energizes the handle 17b towards a direction in which the chuck 17 grips the gripped section 11d.

The base 10a has a hydraulic pressure cylinder 18 that causes the handle 17b to move against the energizing force of the coil spring 17c, to detach the gripped section 11d from the chuck 17.

The hydraulic pressure cylinder 18 has a rod 18a that mounts a base end of a locking plate 19 whose tip is locked with the handle 17b. The hydraulic pressure cylinder 18 causes the handle 17b to lower down by contraction of the rod 18a, thus making the gripped section 11d detachable from the chuck 17.

The coil 13 made of the wire 12 sequentially wound obliquely around the winding core 11 is taken off from the winding device together with the plurality of hook rods 14, in a state wound around the winding core 11. Thereafter, the gripped section 11d is gripped by the chuck 17 of the coil shaping device 10, to attach the winding core 11 along an extended line of the same axis as the rotating shaft 16a of the motor 16.

The coil shaping device 10 includes a plurality of rollers 21 whose outer circumference is formed with a concave groove having an arc-shaped cross section.

The coil shaping device 10 has a hydraulic pressure cylinder 22 as a roller moving mechanism that causes movement of a plurality of rollers 21 between a gripping position at which the coil 13 is gripped from its surroundings and a separating position at which the coil 13 is separated. In the present embodiment, three rollers 21 are used, as shown in FIG. 2.

Figure 2:
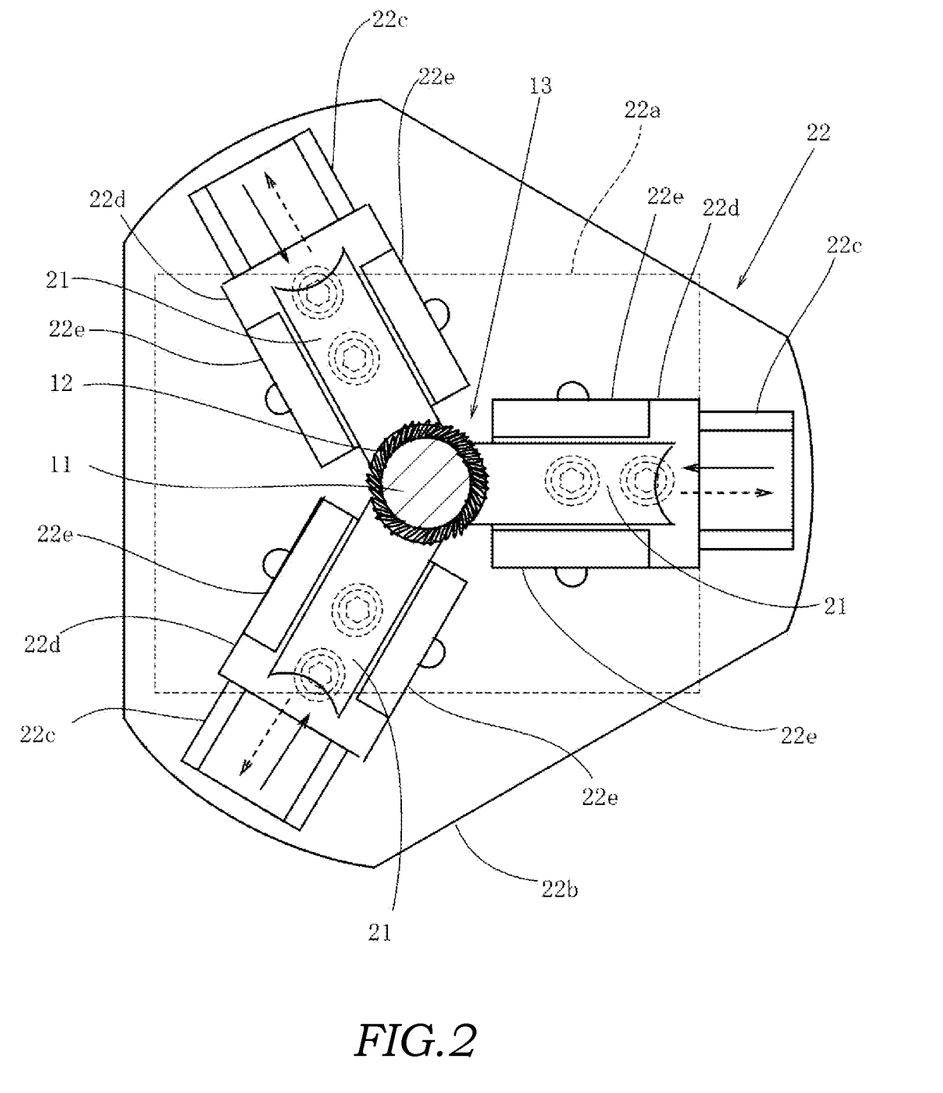
FIG. 2 is a cross sectional view taken on line II-II in FIG. 1, and is a view showing an arranged state of a plurality of rollers.

The hydraulic pressure cylinder 22, as shown in FIG. 1 and FIG. 2, is configured such that a slider 22d is movable along a rail 22c by hydraulic pressure. On a plane facing the winding core 11, of a body 22a of the hydraulic pressure cylinder 22 (lower plane in FIG. 1), the plurality of rollers 21 is radially provided in a movable state.

More specifically, the body 22a has a horizontal table 22b at its lower section. As shown in FIG. 2, the lower plane of the table 22b has three rails 22c radially disposed from a center of the table 22b by every 120 degrees.

Each of the three rails 22c is provided with a slider 22d in a movable state. On both sides of the slider 22d, pillars 22e that sandwich a roller 21 are set up. The pair of pillars 22e pivotally support a roller 21. Since the rails 22c are radially provided, the plurality of rollers 21 are also radially provided.

The hydraulic pressure cylinder 22 can cause the three rollers 21 to radially move by ventilation of compressed air through the slider 22d. As shown in the broken arrows in FIG. 2, when the three rollers 21 radially move to expand the intervals between each other, the plurality of rollers 21 move to the separating position that separates away from the coil 13 formed on the outer circumference of the winding core 11 positioned in the center.

On the other hand, as shown in the solid line arrows in FIG. 2, when the three rollers 21 radially move so as to shorten the intervals between each other, the plurality of rollers 21 move to the gripping position where the coil 13 formed on the outer circumference of the winding core 11 positioned in the center is gripped from its surroundings.

That is to say, the hydraulic pressure cylinder 22 can cause the plurality of rollers 21 to move between the gripping position at which the plurality of rollers 21 grip the coil 13 from the surroundings and the separating position at which the plurality of rollers 21 are separated from the coil 13.

In the present embodiment, three rollers 21 are radially disposed. The rollers 21 used have the same shapes and same sizes. The outer circumference of the rollers 21 has a concave groove whose cross section is of an arc-shape, formed continuously around its entire circumference.

The outer diameter of the rollers 21 and the radius of the arc-shaped cross section of the concave groove are determined based on a relationship between the coil 13 to be shaped. The outer diameter of the rollers 21 is the same length as the length of the coil 13 in the axis direction, or is formed greater than that. The radius of the arc-shaped cross section of the concave groove is formed substantially equal to the radius of the outer circumference of the shaped coil 13.

The coil shaping device 10 includes a rolling movement mechanism 25 that causes the rollers 21 to move at the gripping position by rolling along the longitudinal direction in a state in contact with the outer circumference of the coil 13. The rolling movement mechanism 25 causes the plurality of rollers 21 positioned in the gripping position to move along a vertical direction which is the axial direction of the winding core 11. In the present embodiment, the rolling movement mechanism 25 can cause the plurality of rollers 21 to move within a horizontal plane.

The rolling movement mechanism 25, as shown in FIG. 1, has an X-axis direction expansion actuator 28, a Y-axis direction expansion actuator 26, and a Z-axis direction expansion actuator 27. When ball screws 26b to 28b rotate by being driven by servo motors 26a to 28a, followers 26c to 28c screwed to the ball screws 26b to 28b move along a longitudinal direction of housings 26d to 28d.

In the present embodiment, the body 22a of the hydraulic pressure cylinder 22 is fixed to the supporting member 23. The supporting member 23 is attached to the housing 26d of the Y-axis direction expansion actuator 26, in a movable manner along the Y-axis direction. The follower 26c of the Y-axis direction expansion actuator 26 is attached to the follower 27c of the Z-axis direction expansion actuator 27, such that the supporting member 23 is movable in the Z-axis direction together with the Y-axis direction expansion actuator 26.

Moreover, the housing 27d of the Z-axis direction expansion actuator 27 is attached to the follower 28c of the X-axis direction expansion actuator 28, such that the supporting member 23 is movable in the X-axis direction together with the Y-axis direction expansion actuator 26 and Z-axis direction expansion actuator 27. Furthermore, the housing 28d of the X-axis direction expansion actuator 28 is formed along the X-axis direction and fixed on an upper part of the frame 35.

The frame 35 is fixed to the base 10a. Each servo motors 26a to 28a of respective expansion actuators 26 to 28 is inputted with control signals from controllers (illustrations omitted) for controlling these members.

Described below is a coil shaping method according to an embodiment of the present invention.

Figure 5:
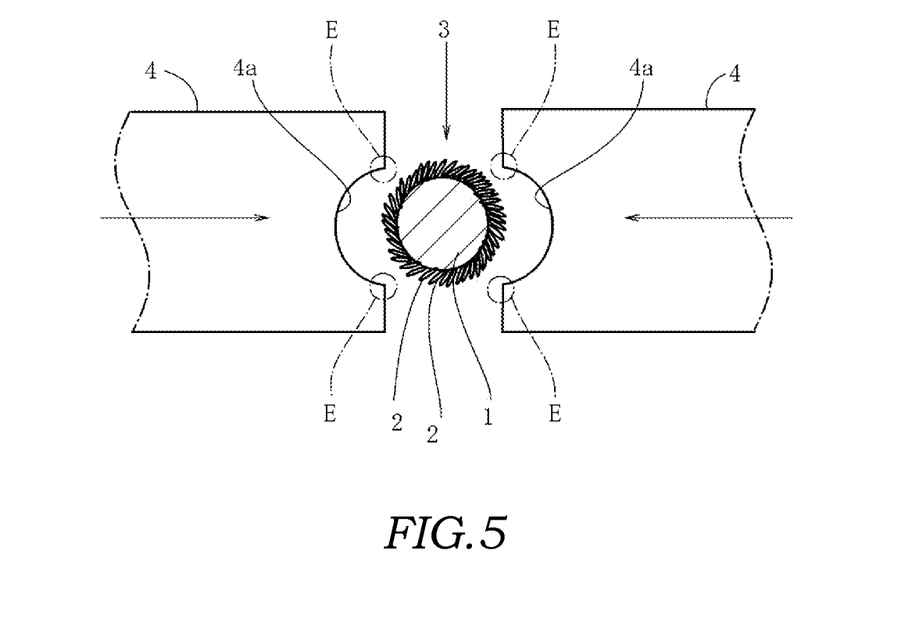
FIG. 5 is a view showing pressing members used for coil shaping in a comparative example of an embodiment of the present invention.
Figure 6A:
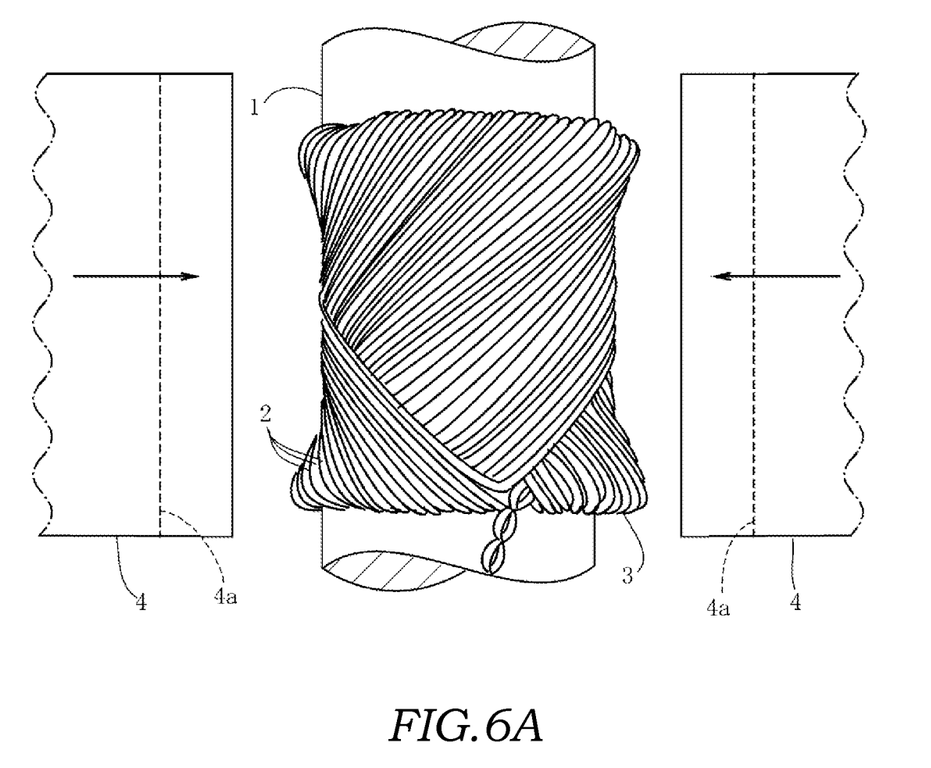
FIG. 6A is a view corresponding to FIG. 3A, showing a view of a state sandwiching a coil with the pressing members of a comparative example.
Figure 6B:
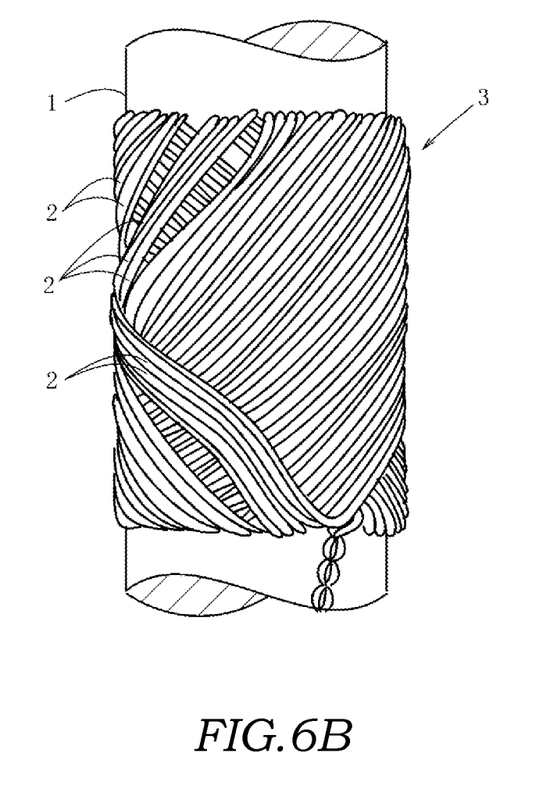
FIG. 6B is a view corresponding to FIG. 3B, and is a view showing a coil shaped by being sandwiched by the pressing members.

First described is a coil shaping method according to a comparative example of an embodiment of the present invention, with reference to FIG. 5, FIG. 6A, and FIG. 6B.

Generally, coils made of wire sequentially wound obliquely around a cylindrical winding core and that are used for rotors such as a coreless motor are required to have a high accuracy in shape. Therefore, with such coils, the wire bent over at an edge in the axis direction requires to be fit to the winding core to prevent the outer diameter at the edges of the coil in the axis direction to expand.

As a method for fitting the wire to the winding core as such, one method is considered in which, as shown in FIG. 5, a pressing member 4 having a concave surface 4a whose cross section is formed substantially equal to the outer shape of the coil 3 is pressure contacted to the wire 2 wound around the winding core 1 from a diameter orientation of the winding core 1, as shown in FIG. 6A.

However, at the edges of the concave surface 4a (section E in FIG. 5), a portion of the wire 2 disposed away from the winding core 1 among the wire 2 wound around the winding core 1 is fit to the winding core 1 after being moved in the circumferential direction of the winding core 1. Therefore, as shown in FIG. 6B, the alignment of the wire 2 becomes lost, which thus may cause difficulty in reducing the outer diameter at the edges in the axis direction of the coil 3.

Next described is a coil shaping method according to the present embodiment. This coil shaping method is a method of shaping the coil 13 made of the wire 12 sequentially wound obliquely around the cylindrical winding core 11.

Figure 3A:
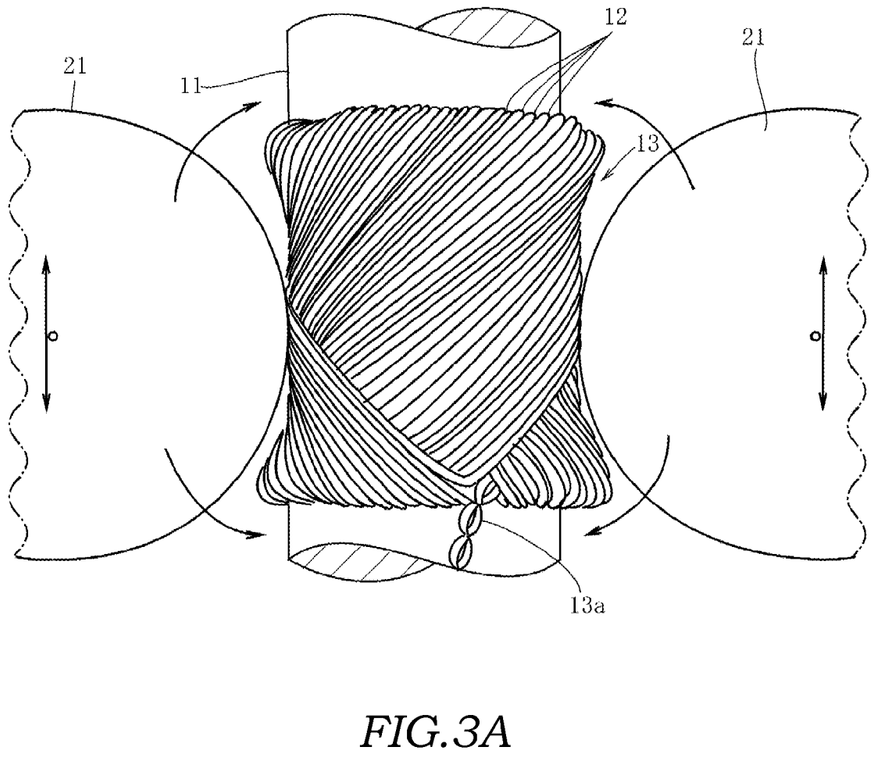
FIG. 3A is a view showing a state in which rollers grip a substantially center of a coil and move by rolling.

In the present embodiment, as shown in FIG. 2 and FIG. 3A, the substantially center in the longitudinal direction of the coil 13 is gripped from the surroundings, by the plurality of rollers 21 whose outer circumference is formed with a concave grooves having an arc-shaped cross section. Furthermore, the plurality of rollers 21 gripping the coil 13 is moved by being rolled along the longitudinal direction of the coil 13 as shown by the solid line arrows in FIG. 3A, to fit the wire 12 wound around the winding core 11 to the winding core 11.

Moreover, after the plurality of rollers 21 gripping the coil 13 is moved by being rolled along the longitudinal direction of the coil 13, the plurality of rollers 21 is separated from the coil 13. After the winding core 11 is rotated about a center axis by a predetermined angle together with the coil 13, the substantially center along the longitudinal direction of the coil 13 is gripped again from its surroundings by the plurality of rollers 21. The plurality of rollers 21 gripping the coil 13 is then again moved by being rolled along the longitudinal direction of the coil 13, to again fit the wire 12 wound around the winding core 11 to the winding core 11.

Specific procedures of the coil shaping method carried out using the coil shaping device 10 is described below.

First, the coil 13 undergoing the shaping is prepared. The coil 13 is made of the wire 12 sequentially wound obliquely around the cylindrical winding core 11. The coil 13 is obtained by sequentially winding the wire 12 obliquely around the cylindrical winding core 11, by a winding device or like device.

The coil 13 is prepared in a state wound around the winding core 11 and is attached to the coil shaping device 10. More specifically, the gripped section 11d connected to the same axis as the winding core 11 having the wire 12 constituting the coil 13 wound around its outer circumference is gripped by the chuck 17.

The gripping of the gripped section 11d is carried out by: contracting the rod 18a of the hydraulic pressure cylinder 18 to lower the handle 17b; advancing the gripped section 11d into the chuck body 17a in this state; extending the rod 18a; and moving the handle 17b by energizing force of the coil spring 17c. This attaches the winding core 11 so as to face a vertical direction on the same axis as the rotating shaft 16a of the motor 16, by having the gripped section 11d gripped by the chuck 17 body.

Next, by the plurality of rollers 21 whose outer circumference is formed with the concave groove having an arc-shaped cross section, the substantially center along the longitudinal direction of the coil 13 is gripped from the surroundings. More specifically, the hydraulic pressure cylinder 22 is moved by the rolling movement mechanism 25, to position the center of the plurality of rollers 21 above the winding core 11.

Thereafter, the plurality of rollers 21 are made into a separated state, and the hydraulic pressure cylinder 22 is lowered together with the plurality of rollers 21. The winding core 11 is then advanced into the center of the plurality of rollers 21, and the plurality of rollers 21 are made to be positioned substantially center along the vertical direction of the coil 13.

Thereafter, the plurality of rollers 21 are made close to each other by the hydraulic pressure cylinder 22, and as shown in FIG. 3A, the substantially center along the longitudinal direction of the coil 13 is gripped from the surroundings by the plurality of rollers 21.

Here, the wire 12 in the substantially center along the longitudinal direction of the coil 13 is fit closely to the winding core 11. The radius of the arc-shaped cross section of the concave groove of the rollers 21 is substantially equal to the radius of the outer circumference of the coil 13 to be obtained. Therefore, the wire 12 in the substantially center along the longitudinal direction of the coil 13 will not be guided in the circumferential direction of the winding core 11 by the abutting of the roller 21. Accordingly, the alignment of the wire 12 will not be lost when the plurality of rollers 21 grips the substantially center along the longitudinal direction of the coil 13.

After the plurality of rollers 21 grips the substantially center along the longitudinal direction of the coil 13, the plurality of rollers 21 gripping the coil 13 is moved by being rolled along the longitudinal direction (vertical direction) of the coil 13, as shown in the solid line arrows in FIG. 3A. This fits the wire 12 wound around the winding core 11 to the winding core 11.

That is to say, by the rolling movement mechanism 25, the plurality of rollers 21 are moved in a reciprocate manner in the vertical direction together with the hydraulic pressure cylinder 22. As a result, the plurality of rollers 21 contacting with the outer circumference surface of the coil 13 is moved by being rolled along the axis direction in a state contacting with the outer circumference surface of the coil 13.

At this time, the wire 12 separated from the winding core 11 at the edges in the axis direction of the coil 13 is treaded on while the roller 21 is moved by being rolled, and the wire 12 is guided in the axis direction of the winding core 11 and is pressed against the winding core 11 for fitting.

After the plurality of rollers 21 gripping the coil 13 is moved by being rolled along the longitudinal direction of the coil 13 and the wire 12 at both edges of the coil 13 is pressed against the winding core 11 and fitted, the plurality of rollers 21 is separated from the coil 13.

The separation of the rollers 21 is carried out by ventilation of compressed air through the hydraulic pressure cylinder 22. The hydraulic pressure cylinder 22 causes the three rollers 21 to move radially in directions separating from each other, via the slider 22d.

After the rollers 21 are separated from the coil 13, the winding core 11 is rotated by a predetermined angle about the center axis of the winding core 11 together with the coil 13.

The rotation of the winding core 11 is carried out by the motor 16 causing the winding core 11 to rotate together with the chuck 17. Here, the predetermined angle denotes an angle that a part of the coil 13 on which the roller 21 has been moved by being rolled has moved between a pair of adjacent rollers 21. In the present embodiment, as shown in FIG. 2, three rollers are provided every 120 degrees, and thus the predetermined angle is 60 degrees.

Thereafter, the substantially center along the longitudinal direction of the coil 13 is again gripped from its surroundings by the plurality of rollers 21, and the plurality of rollers 21 gripping the coil 13 is again moved by being rolled along the longitudinal direction of the coil 13, to fit the wire 12 wound around the winding core 11 to the winding core 11.

As a result, even for parts in which the rollers 21 did not come into contact at the time of the movement by the rolling of the rollers 21, it is possible to guide the wire 12 in the axis direction of the winding core 11 by the movement by the rolling of the rollers 21 and fit the wire 12 to the winding core 11.

The rollers 21 are moved by being rolled along the longitudinal direction of the coil 13, to fit the wire 12 to the winding core 11. Therefore, the wire 12 at the edges in the axis direction of the coil 13 is fit to the winding core 11 while the wire 12 is guided in the axis direction of the winding core 11. Therefore, the wire 12 wound around the winding core 11 will not move in the circumferential direction of the winding core 11, and thus the alignment of the wire 12 will not be lost.

Figure 3B:
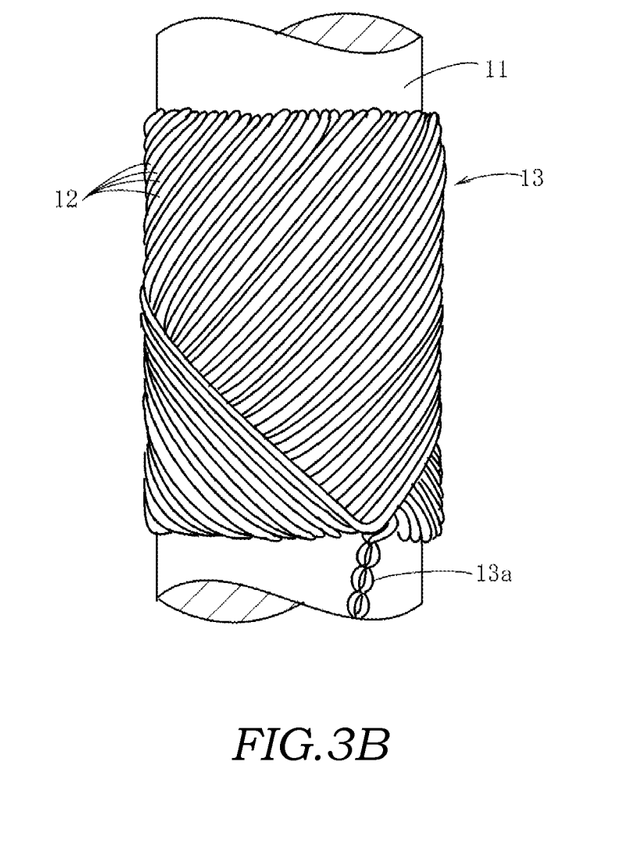
FIG. 3B is a view showing a coil shaped by the rollers moving by rolling.

As such, according to the coil shaping device 10 and the coil shaping method according to the present embodiment, as shown in FIG. 3B, it is possible to fit the wire 12 to the winding core 11 without losing the alignment of the wire 12, and attain a desired value for the outer diameter of the coil 13 made of the wire 12 sequentially wound obliquely around the winding core 11.

Moreover, the radius of an arc-shaped cross section of the concave groove of the rollers 21 is formed substantially equal to the radius of the outer circumference of the shaped coil 13. Therefore, the outer diameter of the coil 13 made of the wire 12 sequentially wound obliquely around the winding core 11 is shaped into the outer diameter to be obtained. Accordingly, it is possible to achieve the desired value of the outer diameter of the coil 13.

Thereafter, the coil 13 shaped to have the desired outer diameter is taken off from the winding core 11. In the coil shaping device 10 of the present embodiment, after the shaping of the coil 13, the plurality of rollers 21 is moved to the separating position and is thereafter raised, and the coil 13 is taken off from the chuck 17 together with the winding core 11. The coil 13 is then taken off from the winding core 11 in a subsequent step.

In the above embodiment, three rollers 21 are radially provided, however the number of the rollers 21 is not limited to three. The number of the rollers 21 may be four or more as long as the coil 13 can be gripped from the surroundings, and as shown in the modification in FIG. 4, may also be two.

Figure 4:
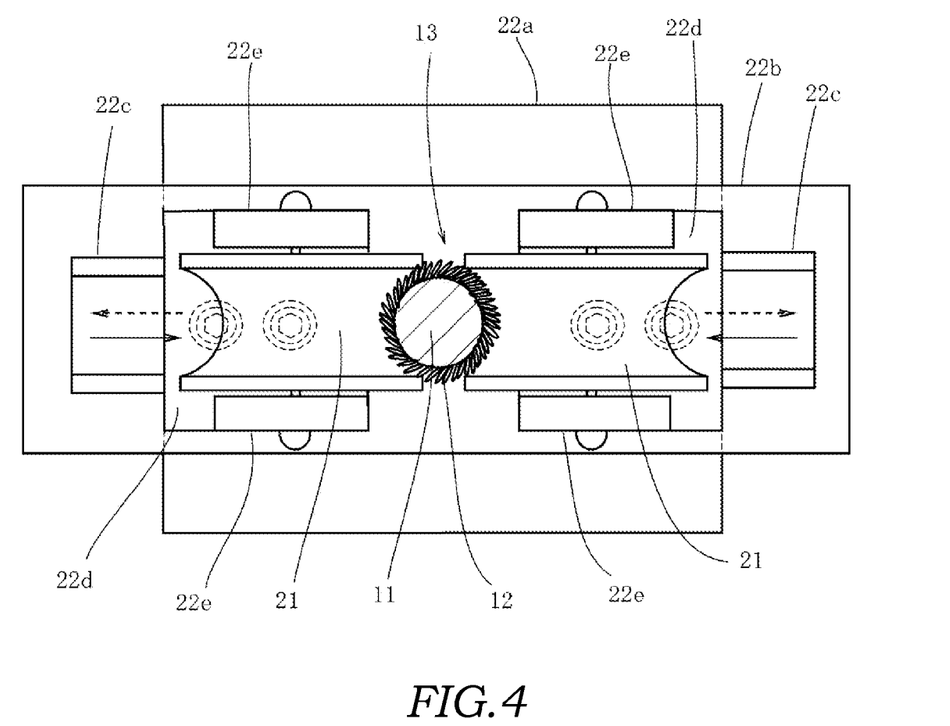
FIG. 4 is a view corresponding to FIG. 2, showing an arranged state of a plurality of rollers in a modification of an embodiment of the present invention.

In the modification shown in FIG. 4, two rollers 21 are provided every 180 degrees. In this case, the rollers 21 gripping the coil 13 is first moved by being rolled, and a predetermined angle to rotate the coil 13 about the center axis to thereafter again move the rollers 21 by being rolled is 90 degrees.

Moreover, in the above embodiment, the rolling movement mechanism 25 is disposed, which can cause movement of the plurality of rollers 21 along the vertical direction as well as being movable within a horizontal plane. However, as long as the rolling movement mechanism 25 allows for the plurality of rollers 21 to move along the longitudinal direction of the coil 13 by being rolled at the gripping position, the rolling movement mechanism 25 does not necessarily need to allow movement of the plurality of rollers 21 within the horizontal plane. Moreover, the rolling movement mechanism 25 may cause the coil 13 to move in the axis direction together with the winding core 11, without the plurality of rollers 21 moving.

Moreover, in the above embodiment, a motor 16 that causes the winding core 11 to rotate is disposed as a winding core relative rotation mechanism. However, as long as the winding core 11 is allowed to rotate with respect to the plurality of rollers 21, instead of a member that causes the winding core 11 to rotate, a member that causes the plurality of rollers 21 to rotate about the axis of the winding core 11 may be used as the winding core relative rotation mechanism.

According to the above embodiments, the following effects are attained.

In the coil shaping device 10 and the coil shaping method according to the present embodiment, the plurality of rollers 21 gripping the coil 13 is moved by being rolled along the longitudinal direction of the coil 13. At this time, the rollers 21 press the wire 12 wound around the winding core 11 against the winding core 11, to fit the wire 12. The rollers 21 are moved by being rolled along a longitudinal direction of the coil 13. Therefore, the wire 12 bent over at the edges in the axis direction of the coil 13 is fit to the winding core 11 while being guided in the axis direction of the winding core 11. Accordingly, the wire 12 wound around the winding core 11 will not move in the circumferential direction of the winding core 11, and thus the alignment of the wire 12 will not be lost.

Therefore, the wire 12 can be fit to the winding core 11 without losing the alignment of the wire 12, and can achieve a desired outer diameter value of the coil 13 made of the wire 12 sequentially wound obliquely around the cylindrical winding core 11.

Embodiments of the present invention were described above, but the above embodiments are merely examples of applications of the present invention, and the technical scope of the present invention is not limited to the specific constitutions of the above embodiments.

The present application claims priority based on Japanese Patent Application No. 2014-065101 filed with the Japan Patent Office on Mar. 27, 2014, the entire contents of which are incorporated into this specification by reference.

What is claimed is:

1. A coil shaping device for shaping a coil made of wire sequentially wound obliquely around a cylindrical winding core, the coil shaping device comprising:

a plurality of rollers having an outer circumference formed with a concave groove having an arc-shaped cross section;

a roller moving mechanism that is configured to make the rollers move between a gripping position at which the plurality of rollers grips the coil from around an exterior surface of the wire, wound to form the coil, and a separating position at which the plurality of rollers is separated from the coil; and a rolling movement mechanism that is configured to make the plurality of rollers positioned in the gripping position move by rolling along a longitudinal direction of the coil.

2. The coil shaping device according to claim 1, wherein the arc-shaped cross section of the concave groove has a radius formed substantially equal to a radius of an outer circumference of the coil having undergone shaping.

3. The coil shaping device according to claim 1, further comprising:

a winding core relative rotation mechanism that is configured to make the winding core rotate about a center axis, with respect to the plurality of rollers.

\* \* \* \* \*